(12) United States Patent  
Coppola, Jr.

(10) Patent No.: US 6,354,037 B2
(45) Date of Patent: Mar. 12, 2002

(54) FISHING LURE

(75) Inventor: William T. Coppola, Jr., New Haven, CT (US)

(73) Assignee: Coppola/Leigh Partnership, New Haven, CT (US)

(*) Notice: Subject to any disclaimer, the term of this patent is extended or adjusted under 35 U.S.C. 154(b) by 0 days.

(21) Appl. No.: 09/358,187

(22) Filed: Jul. 20, 1999

Related U.S. Application Data

(60) Provisional application No. 60/093,465, filed on Jul. 20, 1998.

(51) Int. Cl.$^7$ .............................................. A01K 85/00
(52) U.S. Cl. ...................................................... 43/42.06
(58) Field of Search ..................... 43/42.06, 41, 44.2, 43/42.36, 44.4

(56) References Cited

U.S. PATENT DOCUMENTS

| | | | | |
|---|---|---|---|---|
| 422,226 A | * | 2/1890 | Kester | 43/41 |
| 974,493 A | * | 11/1910 | Immell | 43/42.12 |
| 1,009,077 A | * | 11/1911 | Lockhart et al. | 43/42.06 |
| 1,993,990 A | * | 3/1935 | Catarau | 43/42.06 |
| 2,593,199 A | * | 4/1952 | Salg | 43/42.06 |
| 2,618,096 A | * | 11/1952 | Wagner | 43/42.47 |
| 2,633,659 A | * | 4/1953 | Baum | 43/42.22 |
| 3,530,612 A | * | 9/1970 | Garrison | 43/42.06 |
| 3,688,430 A | * | 9/1972 | Balch | 43/42.06 |
| 4,044,490 A | * | 8/1977 | Young et al. | 43/42.06 |
| 4,267,658 A | * | 5/1981 | Brown et al. | 43/42.06 |
| 4,550,521 A | | 11/1985 | Hayden | |
| 4,553,348 A | * | 11/1985 | Cooper | 43/42.06 |
| 4,777,757 A | | 10/1988 | De Marees van Swinderen | |
| 4,930,245 A | * | 6/1990 | Bazzano | 43/42.17 |
| 4,964,235 A | * | 10/1990 | Gruelle | 43/42.06 |
| 5,224,285 A | * | 7/1993 | Kamin et al. | 43/42.06 |
| 5,444,935 A | | 8/1995 | Pahle | |
| 5,950,351 A | * | 9/1999 | Walker et al. | 43/44.2 |
| 6,079,145 A | * | 6/2000 | Barringer | 43/42.06 |

* cited by examiner

Primary Examiner—Kurt Rowan

(57) ABSTRACT

A fishing lure with an internal bait storage cavity is provided. The fishing lure includes a removable, rigid, plate to securely confine the bait within the lure body cavity, even when subjected to a fish bite. The surrounding water is permitted to immerse the bait within the cavity through smaller holes in the lure body. The lure body is formed and painted to resemble a fish. Eyelets are positioned at both ends of the lure body to enable fishhooks to be attached at either one or both ends of the lure body. A coated wire is positioned axially within the lure body and is coupled at each end to an eyelet to ensure that the hook remains linked to the fishing line in the event the lure body is damaged.

11 Claims, 4 Drawing Sheets

FISHING LURE

This application claims the benefit of the U.S. Provisional Patent Application, Ser. No. 60/093,465, filed Jul. 20, 1998, which is fully incorporated within.

FIELD OF THE INVENTION

The present invention relates to an improved fishing lure with an internal bait storage cavity secured by a fixedly mounted plate to prevent loss of bait during use.

BACKGROUND OF THE INVENTION

A variety of fishing lures have been developed for attracting fish. A common problem with fishing lures is that it is difficult to securely fasten bait to the lure. Bait is often lost during casting or jarred free by a fish bite. Another common problem is that fishhooks are often caught in debris or too difficult to remove from the fish. The fishhooks must then be cut or destroyed in order to remove them.

U.S. Pat. No. 4,550,521 discloses a fishing lure comprising a soft, flexible plastic body and tail. The body contains a large opening through which a fishhook is inserted. The body contains another large opening to place bait within a cavity. The cavity is covered by a flexible plastic flap, connected at one end, that is held in place either by the water pressure when trolling or by tucking the flap into the cavity.

U.S. Pat. No. 4,777,757 discloses a fishing lure apparatus consisting of a hollow tube with threaded ends that can be filled with bait. The tube is surrounded by a plurality of plastic skirts to disguise the hollow tube, leader line, and hook. The operation of the lure requires the assembly of several couplings to secure the hollow tube and plastic skirts. The lure is attached to a new line by first threading the fishing line through each of the components, then assembling the components.

U.S. Pat. No. 5,444,935 discloses a fishing lure comprising a body in the shape of a fish head that has a cylindrical cavity capable of accepting a cylindrical bait plug. A fishhook extends from the body of the lure and is not separable from the rest of the body.

What is desired therefore is a fishing lure that resembles the shape of a fish, has an internal cavity that is capable of securely holding various types and sizes of bait, has holes in the body that permit the surrounding fluid to make contact with the secured bait, has eyelets positioned at both ends of the lure capable of accepting various types and sizes of fishhooks, has a wire positioned axially within the lure body that connects the eyelets so that threading of the fishing line through the lure is unnecessary, and has removable plate for efficient and effortless access to the bait storage cavity, thereby providing fishermen with the flexibility to vary the types of bait they use. In addition, the plate must be fixedly mounted to the lure body so that loss of bait is prevented.

SUMMARY OF THE INVENTION

Accordingly, it is an object of the present invention to provide a hydrodynamic, fish-shaped, fishing lure that has an internal cavity that is capable of securely encapsulating various types, sizes, and quantities of bait.

Another object of the invention is to provide a fishing lure that has holes in the lure body, positioned and angled in such a way as to permit the bait to be immersed in the surrounding fluid without jeopardizing the security of the bait, while permitting the fluid to flow over the bait and rearward from the lure.

A further object of the invention is to provide a fishing lure that has eyelets positioned at both ends of the lure body that are capable of accepting various types and sizes of fishhooks.

Still another object of the invention is to provide a fishing lure that has a wire positioned axially within the lure body that connects the eyelets and eliminates the need to thread fishing line through the lure.

Another object of the invention is to provide a fishing lure that has a removable plate to access the bait storage cavity within and that is capable of being fixedly mounted to the body to prevent loss of bait during use.

These and other objects of the present invention are achieved by provision of a fishing lure with a hydrodynamic, fish-like shape, comprising a lure body that contains an internal, hollow cavity within the housing that is capable of being filled with bait. The lure body has a removable plate that provides access to the internal cavity and is capable of being fixedly mounted to the body to securely enclose the bait during use. The removable plate allows the fisherman to efficiently alternate between different types of bait. Holes are positioned on the body and angled in such a way to permit the fluid surrounding the body to flow into the internal cavity, over the bait contained within the cavity, and out the rear of the lure body as it moves through the water.

The lure body is colored or printed with a design or pattern to resemble a fish. A variety of colors and patterns can be used.

An eyelet is located at each end of the lure body. Each eyelet is capable of accepting various types and sizes of fishhooks to provide the fisherman with the flexibility of changing hooks without changing lures. A stainless steel or coated wire is coupled between the eyelets. The wire eliminates the need to thread the fishing line through the lure, thereby increasing the efficiency with which the fisherman can change lures. The wire also securely links the fishhook to the fishing line so that the hook will remain intact even if the lure body is damaged.

The removable plate is fixedly mounted to the lure body by two conventional screws, one at each end of the plate, although various other ways of attaching the plate are possible. A threaded eyelet may be substituted for one of the screws, thereby providing an additional location to attach a fishhook. Another example of an embodiment is forming a slot around the edges of the opening so that three sides of the plate slide securely into the slot and then securing the remaining side with a conventional screw, thereby preventing the plate from sliding back out. In lures molded from plastic, the plate may be constructed so that no screw is necessary to secure the plate and the plate clips into place. The plate may also be constructed with a forward or rearward lip, known as a "spoon", to cause movement of the lure as it enters the water and during trolling.

The bait cavity can accept various types of bait ranging from live bait to powdered baits. A sponge can be inserted into the cavity to permit the use of liquid baits. The variety of baits and fishhooks that can be used enables the lure to be used for bottom fishing, cast and retrieve fishing, or trolling.

The invention and its particular features and advantages will become more apparent from the following detailed description considered with reference to the accompanying drawings.

DETAILED DESCRIPTION OF THE INVENTION

Referring first to FIGS. 1, 2, 3, and 4, a fishing lure with an internal bait storage compartment is shown, generally indicated at 10. The fishing lure 10 includes a body, generally indicated at 8, with eyelets, generally indicated at 13 and 14, at the nose and at the tail, generally indicated at 11 and 12 respectively.

Figure 8:
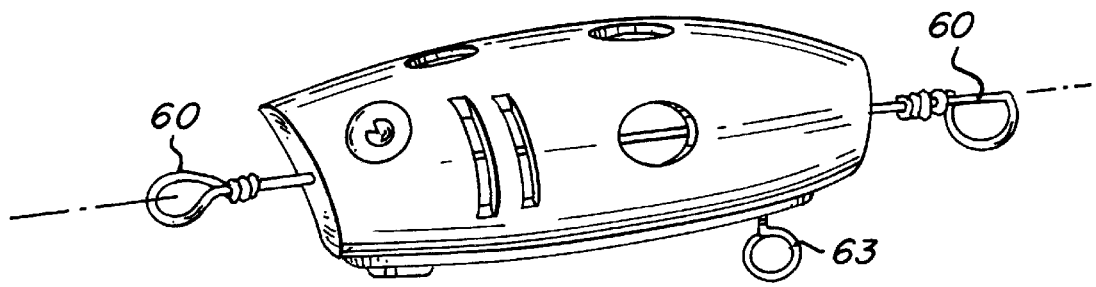
FIG. 8 is an isometric view of the assembled fishing lure showing an alternative embodiment of the hole configuration.

The body 8 is formed and painted to resemble the body of a fish with eyes and scales. The lure body 8 is formed from wood, plastic, or another suitable, rigid material. The lure body 8 can be formed in various sizes, depending on the fish that is being sought. The internal cavity, generally indicated at 20, is generally at least twenty percent smaller than the outside dimension of the body 8 and is formed to mirror the shape of the body 8. Other shapes can be used within the cavity, as shown in FIG. 8, where the cavity is shaped to channel the fluid through the cavity. The internal cavity 20 can be carved or chiseled, in a case where the embodiment is constructed of wood, or it can be formed in the mold, in a case where the embodiment is constructed of plastic.

Figure 1:
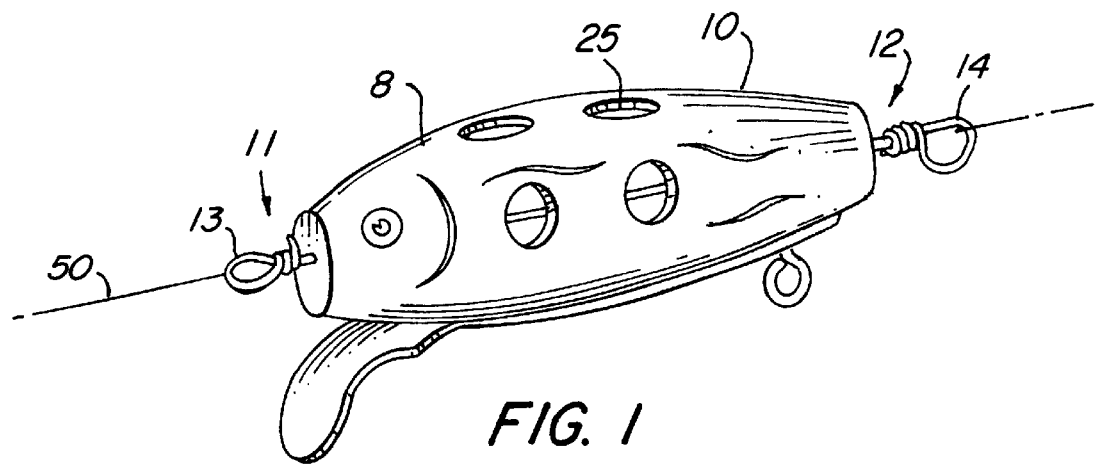
FIG. 1 is an isometric view of the assembled fishing lure.
Figure 10:
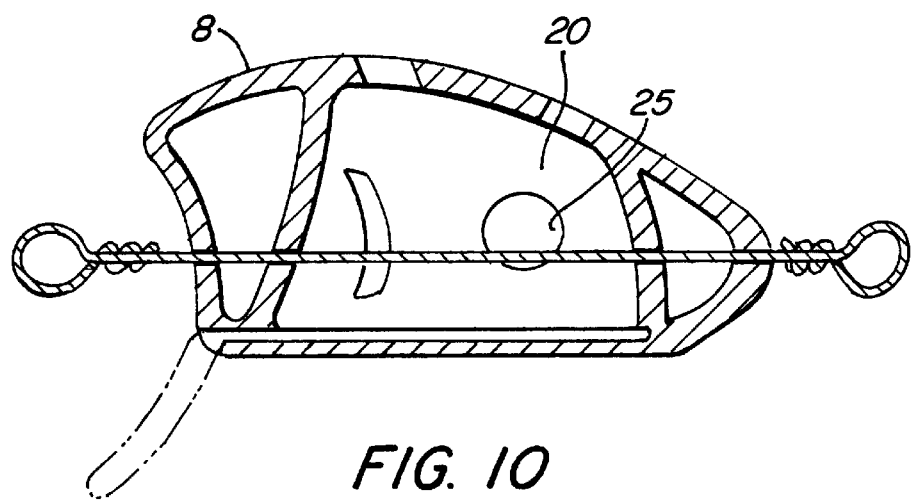
FIG. 10 is a cross-sectional view of an embodiment constructed of plastic with a plastic plate and optional lip, or "spoon," shown in dashed lines.
Figure 6:
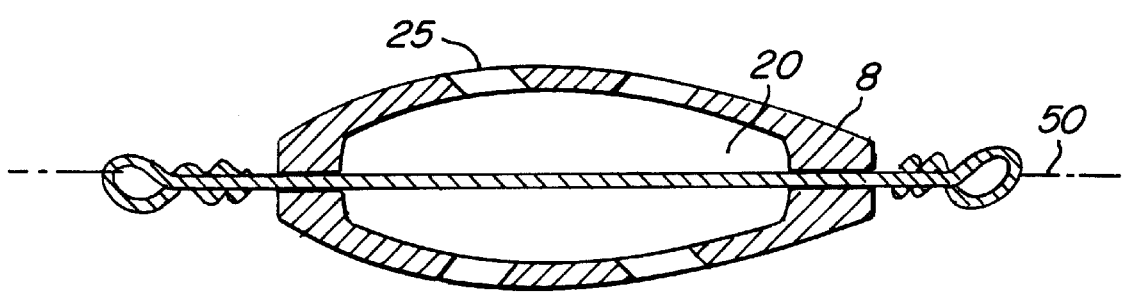
FIG. 6 is a cross-sectional view of an embodiment of the lure body showing the configuration and angles of the holes.
Figure 7:
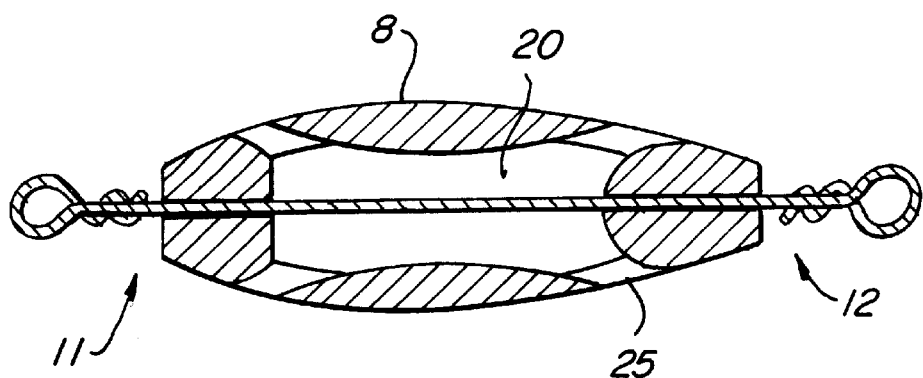
FIG. 7 is a cross-sectional view of another embodiment of the lure body showing the configuration and angles of the holes.
Figure 9:
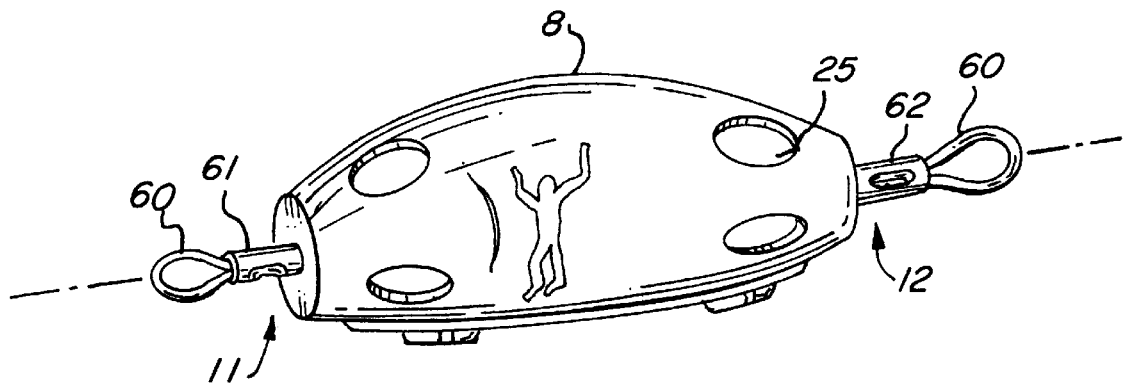
FIG. 9 is an isometric view of the assembled fishing lure showing an alternative embodiment of the hole configuration.

Holes, generally indicated at 25, are formed, punched, or drilled through the body 8 to permit the surrounding fluid to flow to and from the internal cavity 20. One possible hole 25 configuration is shown in FIGS. 1 and 6. In this embodiment, the holes 25 are positioned around the nose 11 and the tail 12. This configuration permits fluid to flow into the cavity 20 through the holes 25 at the nose 11 and out of the cavity 20 through the holes 25 at the tail 12. As shown in FIG. 7, the internal cavity 20 can be formed to direct the fluid flow entering from the holes 25 at the nose 11, through the cavity 20, and exiting the holes 25 at the tail 12. Other hole configurations can be used as shown in FIG. 9. As shown in FIG. 10, the holes do not need to be circular in shape. Penetrations shaped like gills are shown in FIG. 10.

Figure 4:
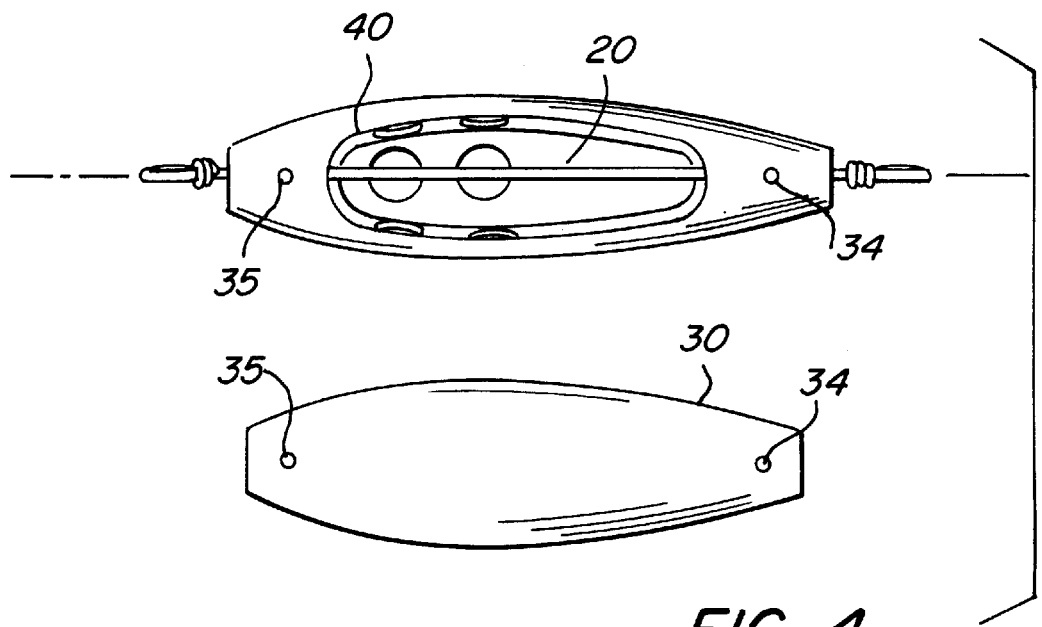
FIG. 4 is a bottom view of an embodiment of the fishing lure that uses conventional screws to fixedly mount the plate, which is shown removed.
Figure 5:
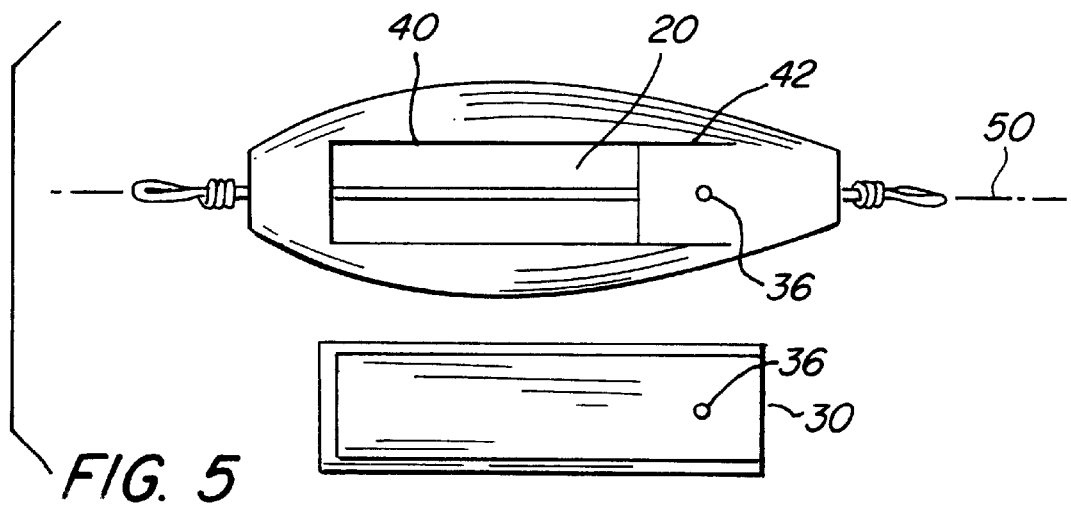
FIG. 5 is a bottom view of an embodiment of the fishing lure that uses a slot formed into the edges of the opening and one conventional screw to fixedly mount the plate, shown removed.

Referring to FIGS. 4 and 5, the internal cavity 20 is accessible through the opening, generally indicated at 40, which is formed into the body 8. The opening can be circular, elliptical, square, or rectangular, depending on the size and shape of the body 8. A rigid plate also referred to as a plate, generally indicated at 30, is formed to mirror the shape of the opening 40. The plate 30 is slightly larger than the opening 40. Plate 30 is used to secure the contents of the internal cavity 20. Each edge of the plate 30 should be in continuous contact with the body 8 to secure the contents of the internal cavity 20. Plate 30 can be fixedly mounted to the body 8 with conventional screws, as shown in FIG. 4 and generally indicated at 34 and 35. A threaded eyelet 63 may be substituted for one of the screws, thereby providing an additional location for a fishhook. In another embodiment, a slot, generally indicated at 42, is formed in the edge of opening 40, as shown in FIG. 5. Plate 30 slides into the slot 42 so that at least two sides of the plate 30 are secured. A conventional screw, generally indicated at 36, may also be installed to ensure that the plate 30 does not slide back out of the slot 42. In embodiments molded in plastic, a plastic plate may be formed so that it clips into place without the use of an additional screw, as shown in FIG. 10. As shown in FIGS. 1 and 10, the rigid plate 30 can be formed with a forward or rearward lip, know as a "spoon" 64.

Figure 2:
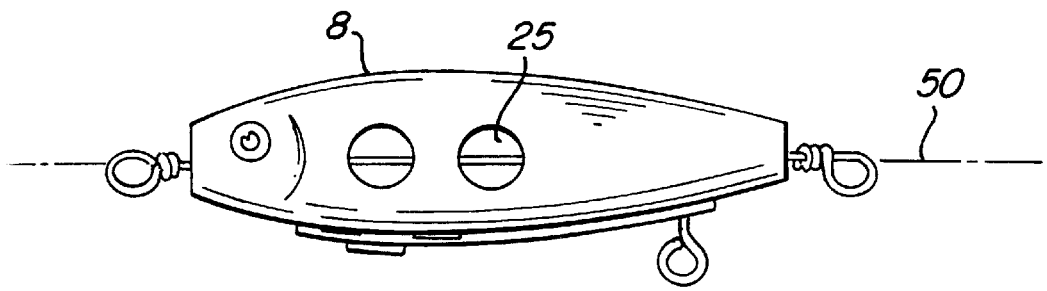
FIG. 2 is a side view of the assembled fishing lure.
Figure 3:
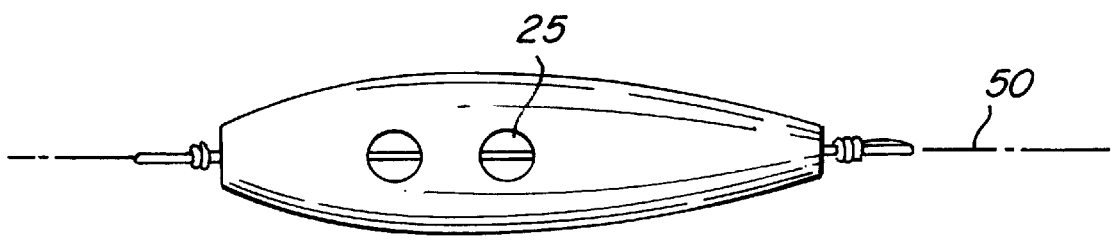
FIG. 3 is a top view of the assembled fishing lure.

Referring to FIG. 2, the eyelets, 11 and 12, are positioned along the same axis, generally indicated at 50, and are both capable of accepting fishing line and fishing hooks of various sizes and design. The eyelets 11 and 12 are constructed by positioning stainless steel wire, coated wire, or fishing line of at least eighty-pound test, generally indicated at 60, axially through the lure body 8. FIG. 9 shows one possible embodiment of the eyelets, constructed in the following way. At the exterior of the nose 11, the wire 60 is turned into a loop, covered by a metal sleeve, generally indicated at 61, so that a loop of approximately ¼ inch diameter remains exposed at the end. The sleeve 61 is then crimped to secure the wire in place. The wire 60 is pulled taut at the outside of the tail 12, turned into a loop, covered with a metal sleeve 62, and then crimped to secure the wire 60 within the body 8. In another embodiment, the eyelets can be formed by first passing the wire 60 through the body 8. The wire 60 is then turned into a loop and wrapped or wound around itself, as shown in FIG. 8. The other end of the wire is then pulled taut, turned into a loop, and wrapped or wound around itself. The diameter of the loop can be increased as necessary for lures of greater size or when using wire of lower gauge.

The present invention, therefore, provides a fishing lure which is capable of securing various types, sizes, and quantities of bait and is capable of accepting various types, sizes, and quantities of fishhooks.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A fishing lure comprising:
   a rigid lure body extending along a longitudinal axis;
   an internal cavity within said body for inserting bait;
   a configuration of holes in said body for permitting the surrounding fluid to flow through said internal cavity during use of the fishing lure;
   an opening in said body for inserting bait into said internal cavity;
   a rigid plate removably secured to said lure body to cover said opening during use of the fishing lure, said plate having a planar peripheral surface juxtaposed with and being in continuous contact with said lure body;
   a wire extending axially through said lure body and having opposite wire ends spaced apart from ends of said lure body;

a pair of opposite eyelets formed on said wire ends by turning wire into a loop and wrapping said wire around itself;

wherein said plate is fixedly secured to said body by at least one screw and wherein said screw comprises a threaded eyelet; and wherein said plate is formed with a forward up which extends below said lure body.

2. A fishing lure defined in claim 1 wherein said plate is fixedly secured to said body by sliding said plate into a channel formed in at least two sides of said opening.

3. A fishing lure defined in claim 1 wherein said body is formed to resemble the shape of a fish.

4. A fishing lure defined in claim 1 wherein said body is colored to resemble the body of a fish.

5. A fishing lure defined in claim 1 wherein an eyelet is positioned on at least one end of said body.

6. A fishing lure defined in claim 5 wherein an eyelet is positioned at each end of the body and wherein a wire is positioned within said body and coupled between each of said eyelets.

7. A fishing lure defined in claim 1 wherein said cavity is formed to channel fluid flow through said cavity.

8. A fishing lure defined in claim 1 wherein said holes are configured so that at least one row of said holes surrounds the nose of said body and another row of said holes surrounds the tail of said body.

9. A fishing lure defined in claim 1 wherein said holes are configured so that at least one row of said holes surrounds the central portion of said body.

10. A fishing lure defined in claim 1 wherein said holes are configured so that at least one of the said holes is positioned on each side of said body.

11. A fishing lure defined in claim 1 wherein said holes are positioned at angles to promote fluid flow into and out of said cavity with respect to the movement of said lure during trolling.

* * * * *